United States Patent
Shibata et al.

(10) Patent No.: US 7,454,441 B2
(45) Date of Patent: Nov. 18, 2008

(54) IMAGE FORMING APPARATUS, IMAGE READING APPARATUS AND PROGRAM

(75) Inventors: Koichi Shibata, Sakai (JP); Hideyuki Matsuda, Suita (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 351 days.

(21) Appl. No.: 11/025,732

(22) Filed: Dec. 30, 2004

(65) Prior Publication Data

US 2005/0213133 A1    Sep. 29, 2005

(30) Foreign Application Priority Data

Mar. 24, 2004 (JP) .............................. 2004-086730

(51) Int. Cl.
*G06F 7/00* (2006.01)
(52) U.S. Cl. ..................................... 707/104.1; 707/101
(58) Field of Classification Search ......... 707/100–102, 707/104.1, 200; 358/400–409
See application file for complete search history.

(56) References Cited

U.S. PATENT DOCUMENTS 6,336,144 B1 *  1/2002  Otani et al. ................. 709/232
2003/0016394 A1 *  1/2003  Shinomiya ................... 358/402
2004/0243635 A1 * 12/2004  Christophersen et al. .. 707/104.1

FOREIGN PATENT DOCUMENTS

| JP | 8-289067 A | 11/1996 |
|----|------------|---------|
| JP | 11-331469 | 11/1999 |
| JP | 2002-218147 A | 8/2002 |
| JP | 2003-333251 A | 11/2003 |

OTHER PUBLICATIONS

Office Action also with English translation issued by Japanese Patent Office dated Apr. 4, 2006.

* cited by examiner

*Primary Examiner*—Wilson Lee
(74) *Attorney, Agent, or Firm*—Buchanan Ingersoll & Rooney PC (57) ABSTRACT

The MFP 101 compresses the image data read by the scanner 102 using the JBIG format, and then stores the image data in the image-data storing unit 104. The converting unit 109 of the MFP 101 converts the stored image data into a specific file format and then outputs this converted image data. Herewith, the user need not have the MFP read the original source once again even when image data of that source is requested to be output in a different file format.

11 Claims, 9 Drawing Sheets

| IMAGE DATA | DATE | TIME | OUTPUT MEANS | DESTINATION | FILE FORMAT | IDENTIFIER | OUTPUT RESULT | NUMBER OF OUTPUTS |
|---|---|---|---|---|---|---|---|---|
| A | 2003.8.26 | 14:33 | E-mail | aaa@konica.jp | JPEG | 1 | OK | 0 ←A1 |
|  | 2003.9.6 | 10:48 | FTP | 111.22.33.44 | PDF | 2 | OK | 0 |
|  | 2003.9.6 | 20:25 | SMB | ¥¥mrx | TIFF | 3 | OK | 0 |
|  | 2003.9.12 | 18:12 | E-mail | bbb@minolta.jp | JPEG | 1 | OK | 1 ←A4 |
|  | ... | ... | ... | ... | ... | ... | ... | ... |
| B | 2003.8.31 | 12:56 | FTP | 111.22.33.44 | PDF | 2 | OK | 0 |
|  | 2003.9.1 | 11:23 | E-mail | aaa@konica.jp | JPEG | 1 | OK | 0 |
|  | 2003.9.1 | 16:08 | E-mail | bbb@minolta.jp | JPEG | 1 | OK | 1 |
|  | 2003.9.1 | 17:55 | SMB | ¥¥mrx | TIFF | 3 | OK | 0 |
|  | ... | ... | ... | ... | ... | ... | ... | ... |

IMAGE FORMING APPARATUS, IMAGE READING APPARATUS AND PROGRAM

This application is based on application No. 2004-086730 filed in Japan, the contents of which are hereby incorporated by reference.

BACKGROUND OF THE INVENTION

[1] Field of the Invention

The present invention relates to an image-forming apparatus that reads image data from its original source, in particular to a technology for reusing image data.

[2] Description of the Related Art

Among image-forming apparatuses, there has been a model that outputs image data read from its original source through an e-mail attachment (see, e.g. Japanese Laid-Open Patent Application Publication No. H11-331469). In addition, another type stores image data of its original source on the HDD (Hard Disk Drive) in order to re-output it. On the HDD, the image data is stored in a file format specified by the user when being read from the original source. When the image data is to be re-output, the image-forming apparatus outputs the image data which has been stored on the HDD to the destination.

However, when there is more than one destination, each destination may request the same image data in a different file format. This is, for instance, the case when Destination A wants to use the image data in a JPEG format while Destination B wants to use the image data in a PDF format. Besides, the same destination may want to use the same image data in a different file format later on.

Conventional image-forming apparatuses are able to reuse image data only when the file format of the image data stored on the HDD happens to match the one requested. If these two are not the same, however, the image-forming apparatuses are not able to meet the request of the destination. If the latter is the case, then the user has to make extra effort to specify a desired file format for the image data to be output and operate an image-forming apparatus to read the original source once again.

SUMMARY OF THE INVENTION

Given the above factors, the present invention aims to provide an image-forming apparatus that does not require reading an original source again even when image data of that source is requested to be output in a different file format.

The image-forming apparatus of the present invention that copies an original source comprises: an image reading unit; an image-data storing unit; an image forming unit; an output-instruction receiving unit; a converting unit; and an output unit. The image reading unit is operable to read image data from the original source. The image-data storing unit is operable to store the read image data in a predetermined file format. The image forming unit is operable to form an image on a recording medium by reading out the stored image data. The output-instruction receiving unit is operable to receive an output instruction including specification information for specifying a file format that is to be used for outputting the stored image data. The converting unit is operable to convert the stored image data into the file format specified by the specification information. The output unit is operable to output the converted image data to a destination.

According to the above configuration, when an output process is performed in which stored image data is to be output to the outside, the image-forming apparatus converts the image data, which has been stored in a predetermined file format, into a file format specified according to the specification information, and outputs this converted image data. When a copying process is performed, an image is formed based on the corresponding image data that has been stored in a predetermined file format. Consequently, in the above both processes, the user need not have the image-forming apparatus read the original source more than once.

Here, the image-forming apparatus of the present invention may further comprise a correspondence-table storing unit operable to store a correspondence table in which one or more destinations are associated with one or more file formats. The specification information is one of the destinations. The converting unit refers to the correspondence table and specifies the file format for the conversion according to the specified destination.

According to the above configuration, the image-forming apparatus outputs image data in a file format specified according to the destination. Consequently, when the destination is the same, the file format does not have to be specified with each output of the image data. Thus, this results in an improvement in convenience for the user.

Here, one or more output histories regarding the output image data may be used as the correspondence table. A destination and a file format used for an output to the destination have been associated in each of the output histories.

According to the above configuration, if the destination of image data is the same as the preceding output, the image-forming apparatus outputs the image data in the same file format. Consequently, when the image data is required to be output once again, the user need not specify the file format, which results in an improvement in convenience for the user.

The image-forming apparatus of the present invention may further comprise a history storing unit operable to store one or more output histories regarding the output image data. A destination and a file format used for an output to the destination have been associated in each of the output histories. The converting unit specifies the file format for the conversion according to the specification information, when information indicating the file format that is to be used for outputting the stored image data is included in the output instruction as the specification information, or otherwise refers to the output histories to specify the file format.

According to the above configuration, the image-forming apparatus outputs image data in a file format specified according to the destination. Consequently, when the destination is the same, the file format does not have to be specified with each output of the image data. Thus, this results in an improvement in convenience for the user.

Here, the converting unit may select a file format used for the most recent output to the destination, to which the converted image data is to be output, as the file format, when a plurality of file formats has been associated with the destination in the output histories.

According to the above configuration, the image-forming apparatus selects a file format used for the most recent output to the destination. Thus, when the image data is to be re-output, the image-forming apparatus is capable of outputting the image data in the same file format used for the preceding output to the destination.

Here, the image-data storing unit may use only one type of file format as the predetermined file format.

According to the above configuration, the image-forming apparatus need not have more than one encoder, which leads to a cost saving.

Here, the predetermined file format may be a compression format for compressing the read image data.

According to the above configuration, the image data is compressed. This realizes an effective utilization of the storage of the image-data storing unit.

Here, the image-forming apparatus of the present invention may further comprise: an image compressing unit and an image expanding unit. The image compressing unit is operable to compress the read image data in the compression format, and send the compressed image data to the image-data storing unit. The image expanding unit operable to expand the compressed image data using an expansion format corresponding to the compression format, and send the expanded image data to the image forming unit and the converting unit.

According to the above configuration, the image-forming apparatus is capable of compressing image data.

Here, the image compressing unit and the image expanding unit may be composed of hardware.

According to the above configuration, the image-forming apparatus is capable of reducing time for compressing image data, compared to the case in which they are composed of software.

The image-reading apparatus of the present invention that reads image data from an original source and outputs the image data to a destination comprises: an image reading unit; an image-data storing unit; an output-instruction receiving unit; a converting unit; and an output unit. The image reading unit is operable to read the image data from the original source. The image-data storing unit is operable to store the read image data in a predetermined file format. The output-instruction receiving unit is operable to receive an output instruction including specification information for specifying a file format that is to be used for outputting the stored image data. The converting unit is operable to convert the stored image data into the file format specified by the specification information. The output unit is operable to output the converted image data to the destination.

According to the above configuration, the image-reading apparatus converts stored image data, which has been stored in a predetermined file format, into a file format specified according to the specification information. Consequently, the user need not have the image-reading apparatus read the original source once again.

Here, the image-reading apparatus may further comprise a correspondence-table storing unit operable to store a correspondence table in which one or more destinations are associated with one ore more file formats. Here, the specification information is one of the destinations. The converting unit refers to the correspondence table and specifies the file format for the conversion according to the specified destination.

According to the above configuration, the image-reading apparatus outputs image data in a file format specified according to the destination. Consequently, when the destination is the same, the file format does not have to be specified with each output of the image data. Thus, this results in an improvement in convenience for the user.

Here, one or more output histories regarding the output image data may be used as the correspondence table. A destination and a file format used for an output to the destination have been associated in each of the output histories.

According to the above configuration, if the destination of image data is the same as the preceding output, the image-reading apparatus outputs the image data of the same file format as the preceding output. Consequently, when the image data is required to be output once again, the user need not specify the file format, which results in an improvement in convenience for the user.

Here, the image-data storing unit may use only one type of file format as the predetermined file format.

According to the above configuration, the image-forming apparatus need not have more than one encoder, which leads to a cost saving.

Here, the predetermined file format may be a compression format for compressing the read image data.

According to the above configuration, the image data is compressed. This realizes an effective utilization of the storage of the image-data storing unit.

The program of the present invention that drives an image-forming apparatus for copying an original source comprises the following steps: (a) reading image data from the original source; (b) storing the read image data in a predetermined file format; (c) forming an image on a recording medium by reading out the stored image data; (d) receiving an output instruction including specification information for specifying a file format that is to be used for outputting the stored image data; (e) converting the stored image data into the file format specified by the specification information; and (f) outputting the converted image data to a destination.

An image-forming apparatus installed with a program having the above configuration achieves the same effects as the image-forming apparatus described above.

The program of the present invention that drives an image-reading apparatus for reading image data from an original source and outputting the image data to a destination comprises the following steps: (a) reading the image data from the original source; (b) storing the read image data in a predetermined file format; (c) receiving an output instruction including specification information for specifying a file format that is to be used for outputting the stored image data; (d) converting the stored image data into the file format specified by the specification information; and (e) outputting the converted image to the destination.

An image-reading apparatus installed with a program having the above configuration achieves the same effects as the image-reading apparatus described above.

BRIEF DESCRIPTION OF THE DRAWINGS

These and other objects, advantages and features of the invention will become apparent from the following description thereof taken in conjunction with the accompanying drawings which illustrate a specific embodiment of the invention.

In the Drawings

DESCRIPTION OF THE PREFERRED EMBODIMENTS

The following gives a detailed account of the best embodiments of the present invention by the aid of drawings.

First Embodiment

Figure 1:
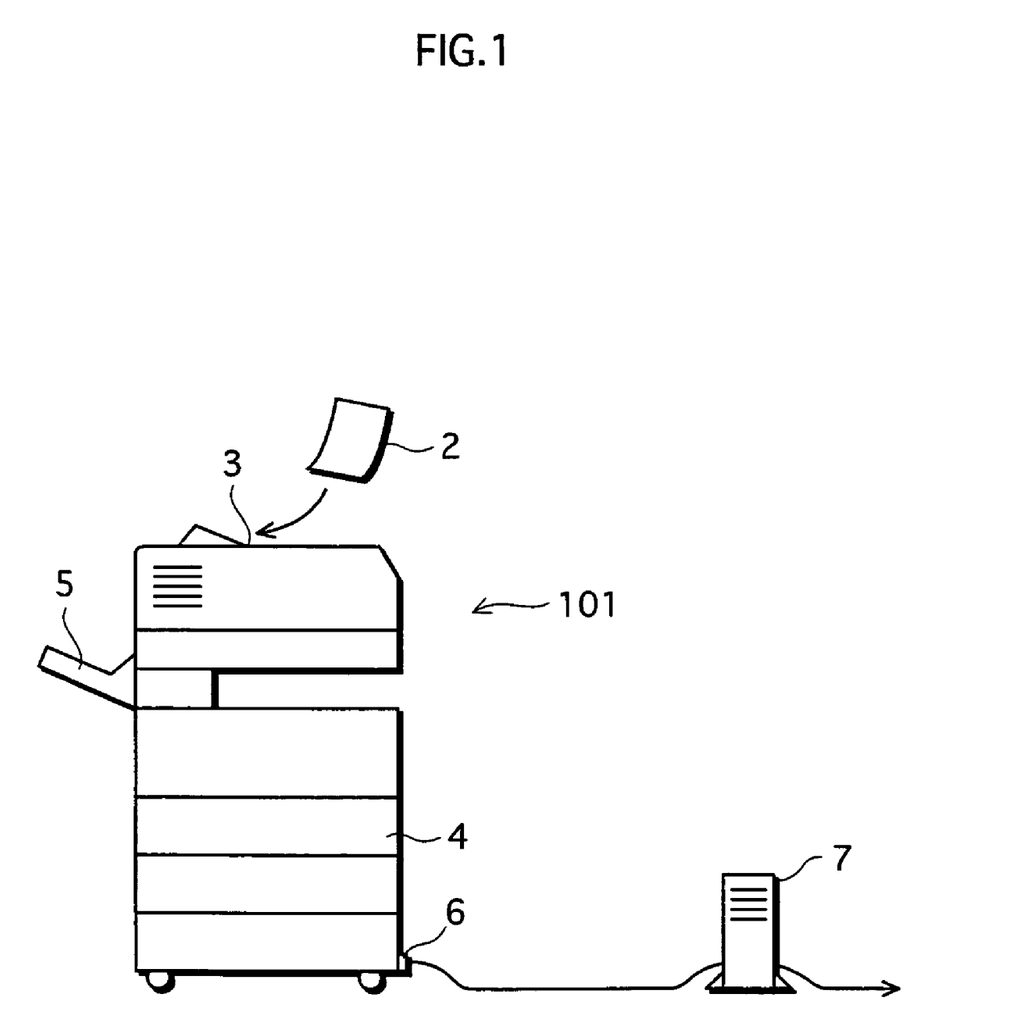
FIG. 1 is an appearance diagram of an MPF (Multi Function Peripheral) of the present invention.

FIG. 1 is an appearance diagram of an MPF (Multi Function Peripheral) of the present invention.

The MFP 101 is an image-forming apparatus realizing various functions including a scanner function, a printer function, and a communication function. The scanner function is a function of scanning an original source 2 set in an original source feeder 3 and reading in image data of the original source 2. The printer function is a function of printing the image data on paper stored in a paper feed tray 4 and ejecting the printed paper to a catch tray 5. The communication function is a function of communicating with external devices via an external interface 6. In an example shown in FIG. 1, the MFP 101 is connected to a router 7. Note that the MFP 101 can be used as an image-reading apparatus that reads image data from an original source and outputs this to outside. These operations are realized through the scanner and communication functions.

Figure 2:
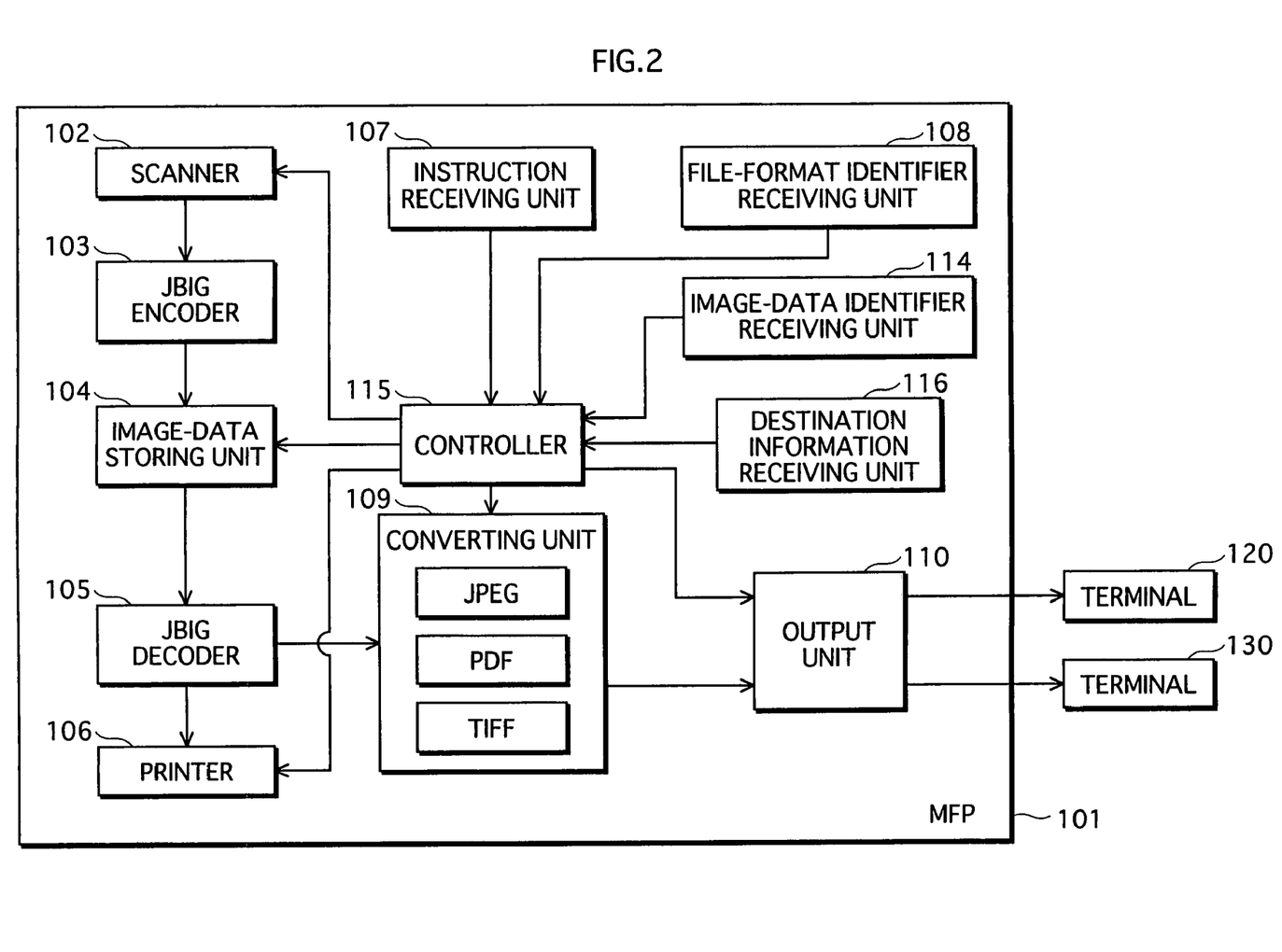
FIG. 2 illustrates a configuration of the MFP of the first embodiment.

FIG. 2 illustrates a configuration of the MFP of the first embodiment.

The MFP 101 comprises: a scanner 102; a JBIG encoder 103; an image-data storing unit 104; a JBIG decoder 105; a printer 106; an instruction receiving unit 107; a file-format identifier receiving unit 108; a converting unit 109; an output unit 110; an image-data identifier receiving unit 114; a controller 115; and a destination information receiving unit 116. As its basic function, the MFP 101 has a copy function. The copy function is realized by using the scanner 102, the JBIG encoder 103, the image-data storing unit 104, the JBIG decoder 105, and the printer 106. First, a description of the copy function will be given.

The copy function starts only when the instruction receiving unit 107 receives a copy instruction. The scanner 102 reads an original source and creates the image data. The image data is input to the JBIG encoder 103.

The JBIG encoder 103 compresses the image data using the JBIG (Joint BiLevel Image experts Group). The compressed image data is provided with an identifier and stored in the image-data storing unit 104. To be specific, the image-data storing unit 104 is an HDD.

The JBIG decoder 105 expands the image data compressed by the JBIG standard. The expanded image data is input to the printer 106.

The printer 106 prints out a copy of the original source based on the image data.

The above copy function is designed to perform various processes in order to improve usability.

One such feature is that the image data sent from the scanner 102 is once stored in the image-data storing unit 104, instead of being directly sent to the printer 106. By this means, the user has to have the image data read in by the scanner 102 only once even when multiple copies of the original are to be made. The image data is subsequently stored in the image-data storing unit 104 after compressed by the JBIG. Then, the image data becomes available from the second copy onward by expanding the JBIG-compressed image data, which has been stored in the image-data storing unit 104. Furthermore, storing the JBIG-compressed image data in the image-data storing unit 104 allows for not only making multiple copies but also reusing the image data later on.

Meanwhile, the compression format of the image data, being stored in the image-data storing unit 104, is thus appropriate for the MFP 101, and therefore is also used for the ordinary copy function described above. This compression format is also referred to as an internal format. In this preferred embodiment, the internal format is the JBIG-compression.

In general, the size of image data is as large as several megabytes. Accordingly, in the case when image data is transmitted from the scanner 102 to the image-data storing unit 104, or from the image-data storing unit 104 to the printer 106, it would take considerable time if image data with no compression is transmitted via a bus. With this view, the MFP 101 first compresses image data in the JBIG format and then transmits the compressed image data. This process requires a certain amount of time for the compression yet leads to significant cut-down in the bus transit time since the size of the image data has been reduced.

Furthermore, if hardware is employed to perform the functions of the JBIG encoder 103 and JBIG decoder 105, the above time required for compression can be shortened. Note that the encoded image data can be fully restored to its original form when decoded since the JBIG is a reversible compression. This, therefore, prevents deterioration in the image quality of a copy from the original.

In addition, the image data compression allows an increase in the number of image data files to be stored in the image-data storing unit 104.

The present invention relates to the external output function outputting image data to the outside of the MFP 101. The following gives a detailed description of this function.

The instruction receiving unit 107 can receive a first output instruction and a second output instruction from the user, besides the above copy instruction. How to receive the first output instruction and a second output instruction can be: (1) receiving an input from a touch-panel that is provided with the MFP 101; and (2) receiving via e-mail sent from the user's terminal. The first output instruction is an instruction to read in and output new image data, and the second output instruction is an instruction to output already-stored image data. The instruction receiving unit 107 informs the controller 115 of the received information.

The file-format identifier receiving unit 108 receives a file-format identifier from the user. JPEG (Joint Photographic Experts Group), PDF (Portable Document Format), TIFF (Tagged Image File Format) are examples of the file formats here. Suppose that, in the preferred embodiments, file-format identifiers for JPEG, PDF, and TIFF are 1, 2, and 3, respectively. The file-format identifier receiving unit 108 informs the controller 115 of the received file-format identifier.

The image-data identifier receiving unit 114 receives an image-data identifier from the user. The image-data identifier is an identifier provided for each image data when the image-data storing unit 104 stores image data. The image-data identifier receiving unit 114 informs the controller 115 of the received image-data identifier.

The destination information receiving unit 116 receives destination information indicating a destination of the image data. The destination information is, for example, mail addresses and IP addresses of terminals 120 and 130. The destination information receiving unit 116 informs the controller 115 of the destination information.

Based on each set of information sent respectively from the instruction receiving unit 107, the file-format identifier receiving unit 108, the image-data identifier receiving unit 114 and the destination information receiving unit 116, the controller 115 controls the scanner 102, the image-data storing unit 104, the printer 106, the converting unit 109 and the output unit 110 in the following manner.

(1) When First Output Instruction is Informed

The controller 115 brings the scanner 102 to read in the new image data. Additionally, the controller 115 decides the file format of the image data according to the file-format identifier as well as the destination according to the destination information. The controller 115 informs the converting unit 109 of the decided file format as well as the output unit 110 of the decided destination.

(2) When Second Output Instruction is Informed

The controller 115 brings the image-data storing unit 104 to output image data corresponding to the informed image-data identifier. Additionally, the controller 115 decides both the file format of the image data according to the file-format identifier as well as the destination according to the destination information. The controller 115 informs the converting unit 109 of the decided file-format as well as the output unit 110 of the decided destination.

The converting unit 109 converts the image data output from the JBIG decoder 105 into the file format informed by the controller 115.

The output unit 110 outputs the image data converted by the converting unit 109 to the destination informed by the controller 115. Here, it is assumed that the image data is sent via a network.

Figure 3:
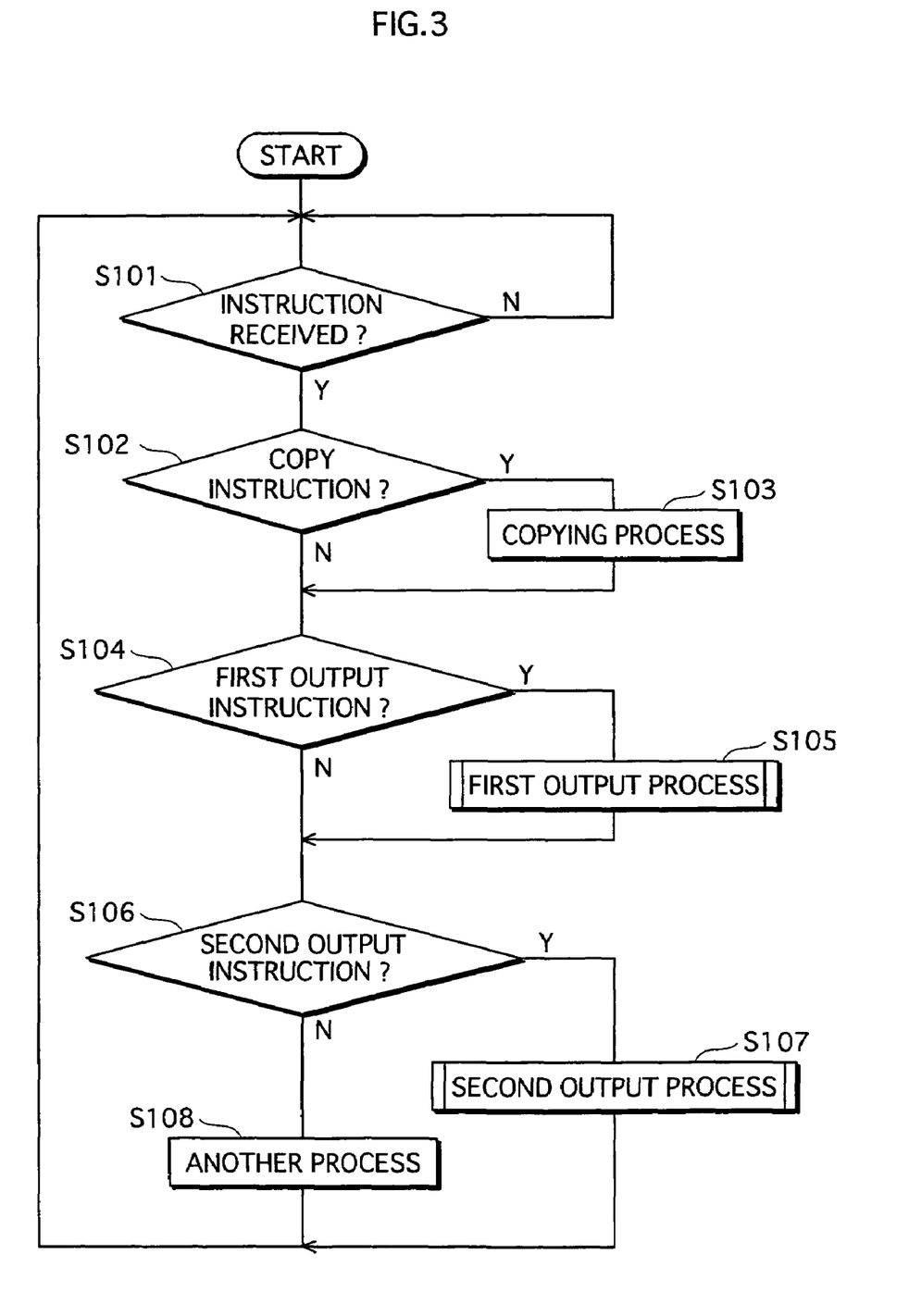
FIG. 3 is a flowchart showing operations performed by the MFP 101 of the first embodiment, in particular illustrating an instruction receiving process.

FIG. 3 is a flowchart showing operations performed by the MFP 101 of the first embodiment, in particular illustrating an instruction receiving process.

In the MFP 101, the instruction receiving unit 107 monitors the presence of instructions for various instructions (Step S101).

When an instruction is received (Step S101: Y) and the instruction is a copy instruction (Step S102: Y), the MFP 101 performs a copying process (Step S103). When the instruction is not a copy instruction (Step S102: N) but a first output instruction (Step S104: Y), the MFP 101 performs a first output process (Step S105). When the instruction is not a first output instruction (Step S104: N) but a second output instruction (Step S106: Y), the MFP 101 performs a second output process (Step S107). The first and second output processes will be described hereinafter. When the instruction is not a second output instruction (Step S106: N) but an instruction for another process, the controller 115 performs the other process (Step S108). When the second output process or the other process is completed, the MFP 101 returns to monitor the instruction presence for various instructions (Step S101).

Figure 4:
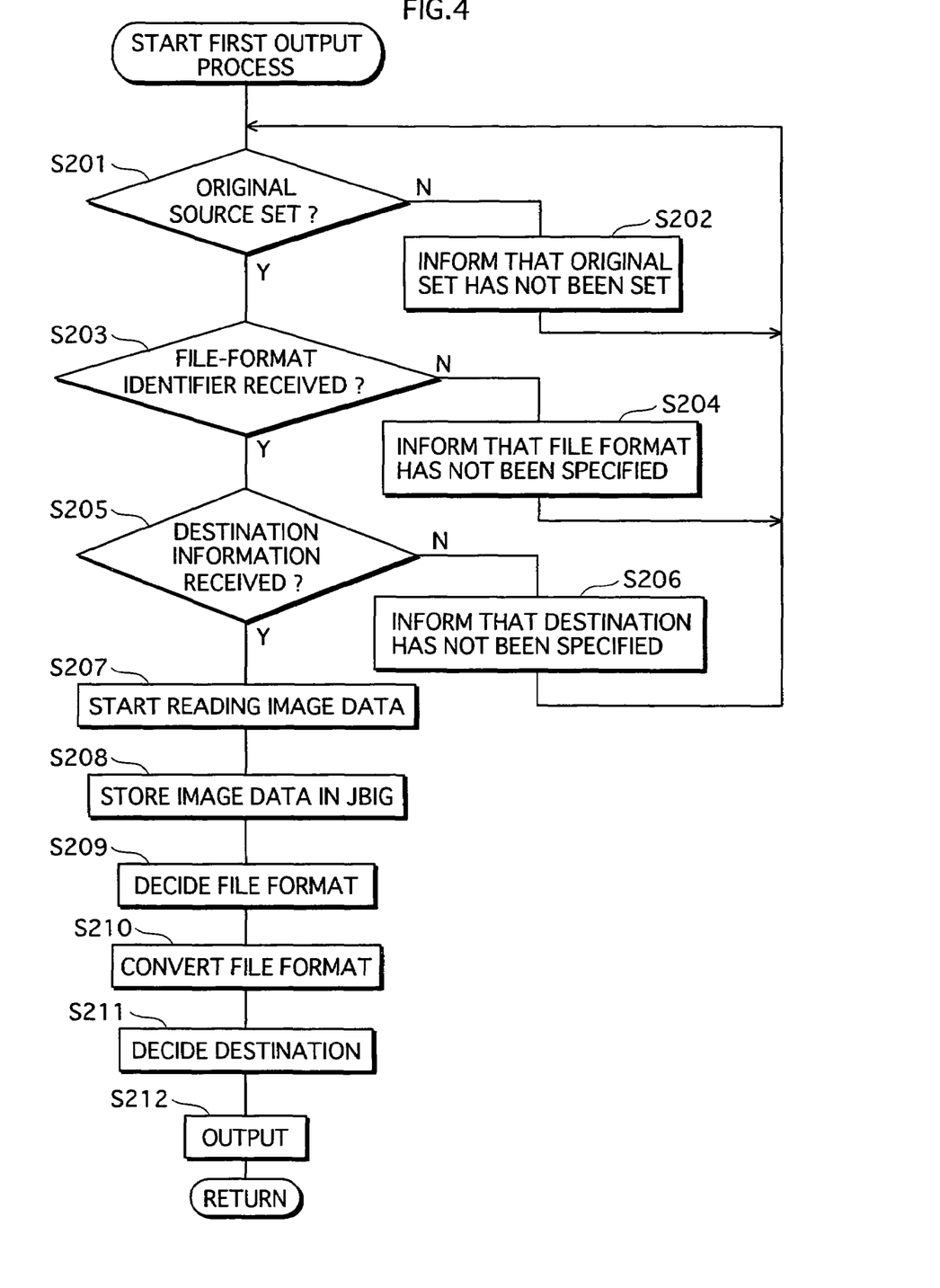
FIG. 4 is a flowchart showing operations performed by the MFP 101 of the first embodiment, in particular showing details of a first outputting process (Step S105)

FIG. 4 is a flowchart showing operations performed by the MFP 101 of the first embodiment, in particular showing details of the first outputting process (Step S105).

If an original source is not set in the original source feeder 3 (Step S201: N), the controller 115 informs the user accordingly (Step S202).

When an original source is set in the original source feeder 3 (Step S201: Y) but the MFP 101 has not received a file-format identifier (Step S203: N), the MFP 101 informs the user that the file-format has not been specified yet (Step S204).

When the MFP 101 has received a file-format identifier (Step S203: Y) but has not received destination information (Step S205: N), the MFP 101 informs the user that the destination has not been specified yet (Step S206).

When the MFP 101 has received destination information (Step S205: Y), the MFP 101 brings the scanner 102 to start reading the image data (Step S207), and stores the read image data in the JBIG format, which is the internal format of the MFP 101, regardless of the file format received at Step S203 (Step S208).

The MFP 101 decides the file format according to the file-format identifier (Step S209), and converts the file format of the image data stored in the JBIG format into the decided file format (Step S210).

The MFP 101 decides the destination according to the destination information (Step S211), and outputs the image data converted into the decided file format to the destination (Step S212).

By performing these steps described above, the MFP 101 is capable of outputting newly read image data of a file format desired by the user.

Figure 5:
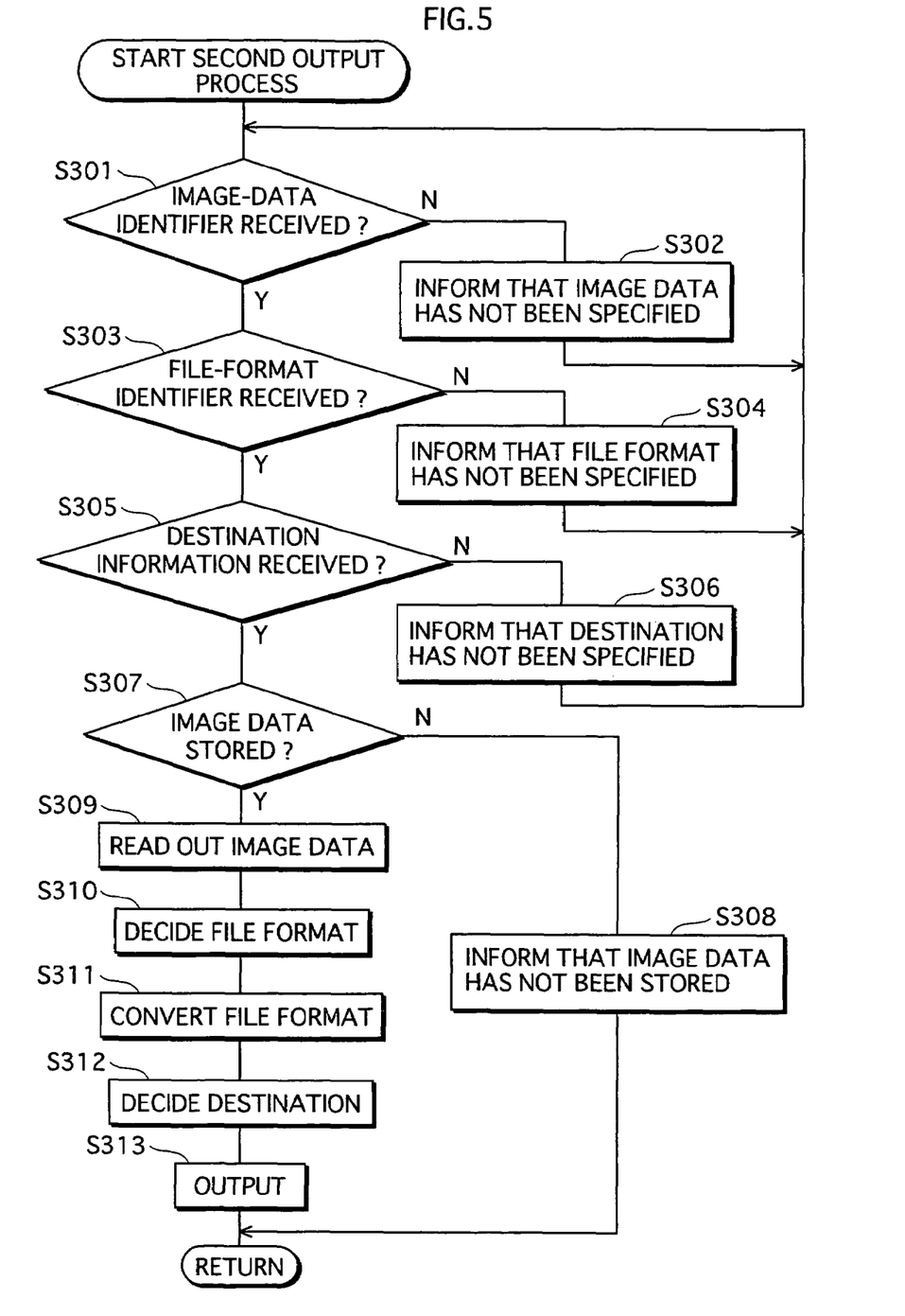
FIG. 5 is a flowchart showing operations performed by the MFP 101 of the first embodiment, in particular showing details of a second outputting process (Step S107)

FIG. 5 is a flowchart showing operations performed by the MFP 101 of the first embodiment, in particular showing details of the second outputting process (Step S107).

When the MFP 101 has not received an image-data identifier (Step S301: N), the MFP 101 informs the user that the image data has not been specified yet (Step S302).

When the MFP 101 has received an image-data identifier (Step S301: Y) but has not received a file-format identifier yet (Step S303: N), the MFP 101 informs the user that the file format has not been specified yet (Step S304).

When the MFP 101 has received a file-format identifier (Step S303: Y) but has not received destination information (Step S305: N), the MFP 101 informs the user that the destination has not been specified yet (Step 306).

When the MFP 101 has received destination information (Step S305: Y) but has not stored the image data in the image-data storing unit 104 (Step S307: N), the MFP 101 informs the user that the image data has not been stored (Step S308).

If the image data has been stored (Step S307: Y), the MFP 101 reads out corresponding image data from the image-data storing unit 104 (Step S309).

The MFP 101 decides the file format according to the file-format identifier (Step S310), and converts the file format of the read-out image data (i.e. the JBIG format, which is the internal format of the MFP 101) into the decided file format (Step S311).

The MFP 101 decides the destination according to the destination information (Step S312), and outputs the image data converted into the decided file format to the destination (Step S313).

By performing these steps described above, the MFP 101 is capable of outputting already-stored image data in a file format desired by the user.

According to the configuration described above, the MFP 101 is able to output image data in a specified file format by converting the already-stored image data. This saves the user the trouble of operating the MFP 101 to read the original source again. Furthermore, the MFP 101 is capable of handling either of the following situations: (1) when there is more than one destination, and each destination requests image data in a different file format; and (2) when the same destination requests image data in a different file format.

Second Embodiment

Figure 6:
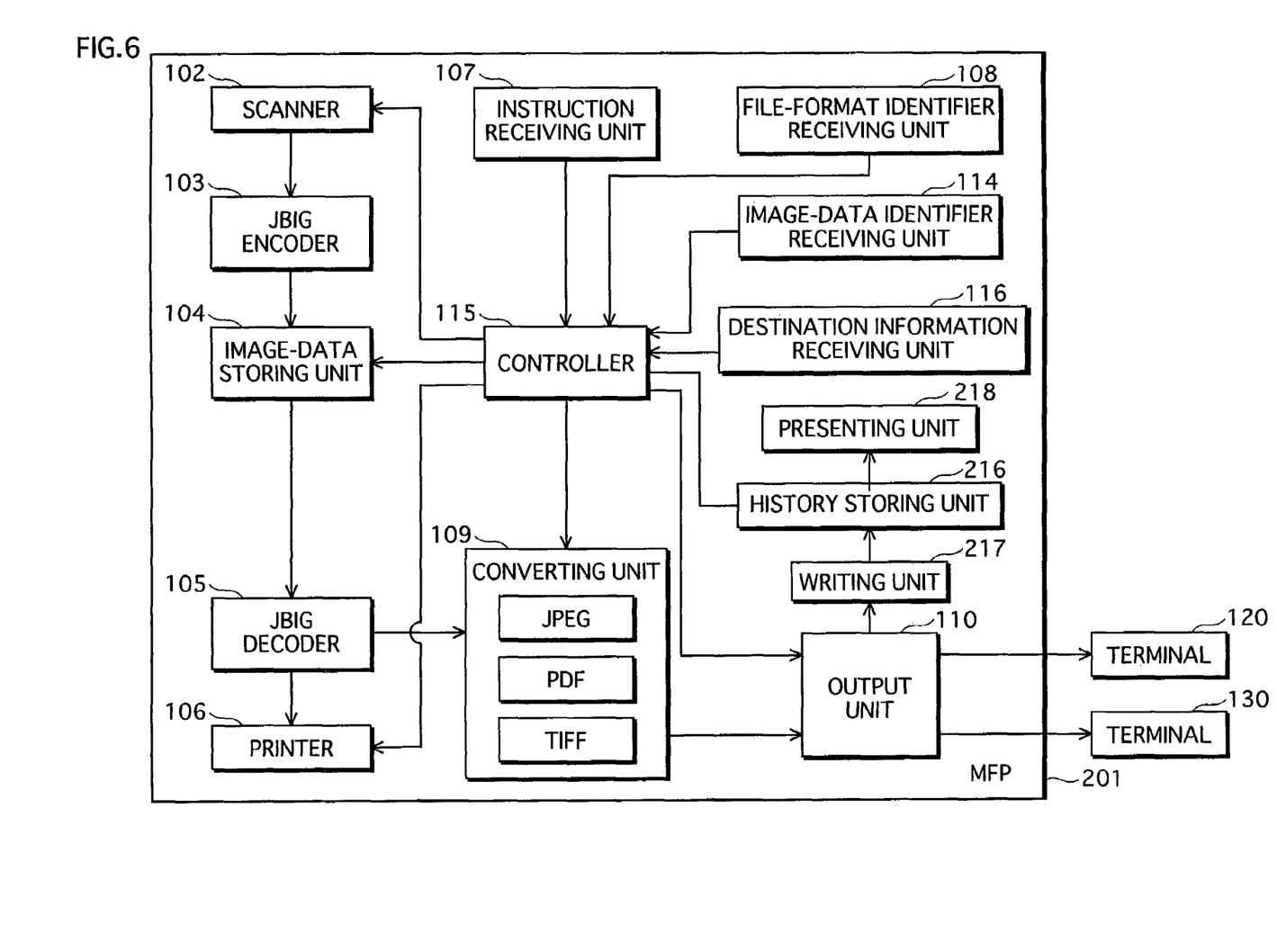
FIG. 6 illustrates a configuration of the MFP of the second embodiment.

FIG. 6 illustrates the configuration of the MFP of the second embodiment.

The MFP 201 has a configuration in which the following units are added to the MFP 101 of the first embodiment: a history storing unit 216; a writing unit 217; and a presenting unit 218. Additionally, in the MFP 201, an output unit 210 and a controller 215 have additional functions, compared to those counterparts in the MFP 101 of the first embodiment. The following provides an explanation only for the differences in the configuration of the second embodiment compared to the first embodiment.

The history storing unit 216 stores an output history table composed of history data of the output unit 210.

Figure 7:
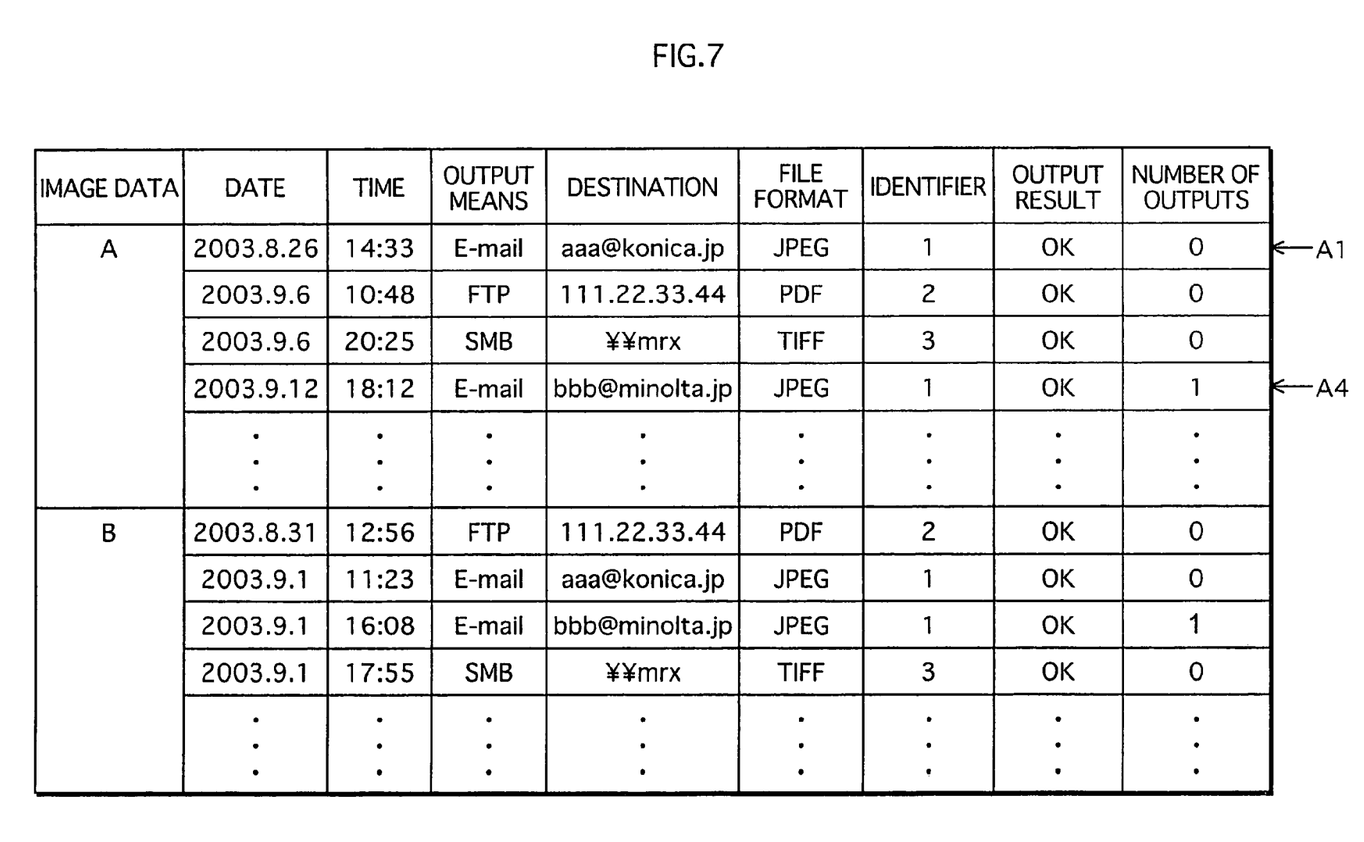
FIG. 7 is an example of an output history table.

FIG. 7 is an example of the output history table.

The output history table manages history data relating to the output. The history data includes the following information for each image data: a reading date; a reading time; an output means; a destination; a file format; a file-format identifier; an output result; and the number of re-outputs. With this information of the output history, it can be determined that, for example, the output unit 210 output Image Data A in the file format of "JPEG" to the destination "aaa@konica.jp" (refer to A1 in FIG. 7). Likewise, it can be seen that the output unit 210 output Image Data A in the file format of "JPEG" to the destination "bbb@minolta.jp" and has re-output "once" (see, A4 in FIG. 7).

The writing unit 217 writes history data in the output history table every time when the output unit 210 outputs image data. More specifically, when the MFP 201 performs the first output process in which new image data is read in and output, the writing unit 217 adds new history data. When the MFP 201 performs the second output process in which already-stored image data is output, the writing unit 217 updates the number of re-outputs in the corresponding history data.

The presenting unit 218 presents the output history table to the user.

In this preferred embodiment, when receiving the second output instruction, the MFP 201 outputs image data of the same file format used for the preceding output, referring to the history data. As a result, since the MFP 201 outputs image data according to the second output instruction, a file-format identifier is not required, and the file format is decided based on the destination with reference to history data. In this aspect, the MFP 201 is different from the MFP 101 of the first embodiment.

When informed of the second output instruction, the controller 215 brings the image-data storing unit 104 to output image data corresponding to the informed image-data identifier. Additionally, the controller 215 refers to the output history table and decides the file format of the image data according to the image-data identifier and the destination information. Furthermore, the controller 215 decides the destination according to the destination information. Then, the controller 215 informs the converting unit 109 of the decided file format as well as informs the output unit 210 of the decided destination.

Here, the decision on the file format is made, for instance, in the following manner.

The controller 215 searches history data "A4" based on "image data A" and "bbb@minolta.jp". According to the history data "A4", the controller 215 decides the file format as "JPEG".

Figure 8:
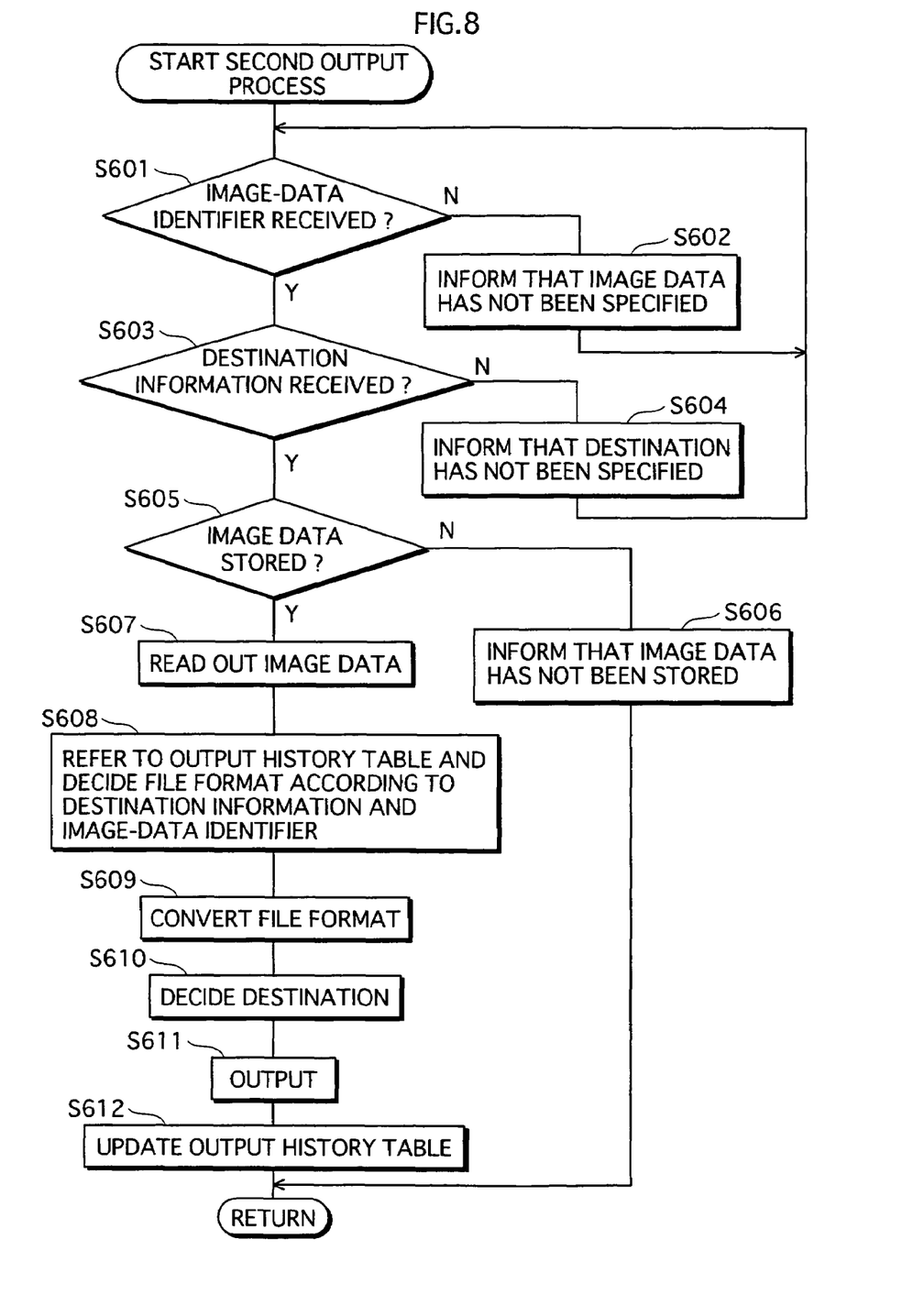
FIG. 8 is a flowchart showing operations performed by the MFP 201 of the second embodiment, in particular showing details of a second outputting process (Step S107)

FIG. 8 is a flowchart showing operations performed by the MFP 201 of the second embodiment, in particular showing details of a second outputting process (Step S107).

When having not received an image-data identifier (Step S601: N), the MFP 201 informs the user that image data has not been specified yet (Step S602).

When the MFP 201 has received an image-data identifier (Step S601: Y) but has not received destination information (Step S603: N), the MFP 201 informs the user that the destination has not been specified yet (Step S604).

When the MFP 201 has received destination information (Step S603: Y) but the image data has not been stored in the image-data storing unit 104 (Step S605: N), the MFP 201 informs the user that the image data has not been stored yet (Step S606).

When the image data has been stored (Step S605: Y), the MFP 201 reads out the corresponding image data from the image-data storing unit 104 (Step S607).

The MFP 201 refers to the output history table and decides the file format for the image data according to the image-data identifier and the destination information (Step S608). Then, the MFP 201 converts the file format of the read-out image data into the decided file format (Step S609).

The MFP 201 decides the destination according to the destination information (Step S610), and outputs the image data converted into the decided file format to the destination (Step S611). Then, the MFP 201 updates the output history via the writing unit 217 (Step S612).

By performing these steps described above, the MFP 201 is capable of outputting already-stored image data in the same file format as the preceding output.

According to the configuration described above, the MFP 201 has a beneficial effect in which the MFP 201 need not receive a specification of the file format every time when re-outputting the same image data to the same destination, on top of the effects obtained with the MFP 101 of the first embodiment.

Since the MFP 201 decides a file format referring to the output histories, the MFP 201 is not applicable to the case in which the same destination requests re-outputting of image data in a different file format. Nonetheless, the MFP 201 improves convenience for the user because the MFP 201 need not receive a specification of the file format again when a request is made for image data to be output in the same file format as the preceding output, for example, in the case when re-output of image data is required due to a malfunction of communication.

Modifications (1) Although the first and second preferred embodiments use the JBIG in order to compress image data, the present invention allows use of different standards of reversible compressions. Reversible compressions are well suited when the image data is to be reused. This is because the image data encoded using a reversible compression can be fully restored to its original form when decoded. Note, however, that a nonreversible compression may be used provided that the deterioration of the image data is within the allowances determined by the performance of the display device of the terminal and the printer that use the image data. With use of a nonreversible compression, an increase in the number of image data files to be stored in the image-data storing unit is expected since a nonreversible compression generally has a higher compression rate than a reversible compression.

(2) Although the output unit transmits image data via a network in the first and second embodiments, the present invention is not confined to this. For example, a drive built in the MFP may write the image data on a portable medium, such as a CD or a DVD.

(3) Although it is an output history that sets a correspondence between a destination and a file format in the second embodiment, the present invention is not limited to this. For example, a correspondence table can be prepared in which how these two correspond is already established.

(4) Although, the number of re-outputs is counted in the output history according to the second embodiment, the number of conversions can be counted instead. This allows usage control, including the use of an accounting system based on the number of conversions.

(5) Although, in the second embodiment, the file format is decided based on the image data and the destination, the present invention is not confined to this. It is adequate as long as the file format is decided depending on at least the destination.

In the case where the file format is decided based only on the destination and a correspondence table showing the relationship between the file formats and the destinations is already established, the file format can be decided by receiving just destination information, not only when image data is to be re-output but also when image data is to be sent for the first time (i.e. when an first output instruction is received).

(6) Note that the MFP may perform the functions described in the first and second embodiments by having a CPU in the MFP execute programs stored in the ROM or RAM.

(7) Although, in the second embodiment, the file format of image data stored in the image-data storing unit 104 is always decided according to the output histories, the present invention is not confined to this. For example, the MFP may newly receive a specification of the file format for the image data stored in the image-data storing unit 104. Note however that, in this case, a plurality of file formats maybe associated, in the output histories, with a single destination. Accordingly, the file format cannot be uniquely determined according to the destination. In order to solve this problem, for example, a file format used for the most recent output to the destination may be selected out of the file formats. If this system, i.e. selecting the file format of the most recent output, is adopted, the image data can be output in the same file format as the preceding output at the time of the re-output. The following gives an account of operations performed by the MFP according to this modification.

The operations performed when the modified MFP here receives the second output instruction differ from those of the second embodiment only in Step S608 in FIG. 8. Therefore, the following provides an explanation only for a file-format deciding process (corresponding to Step S608 of FIG. 8).

Figure 9:
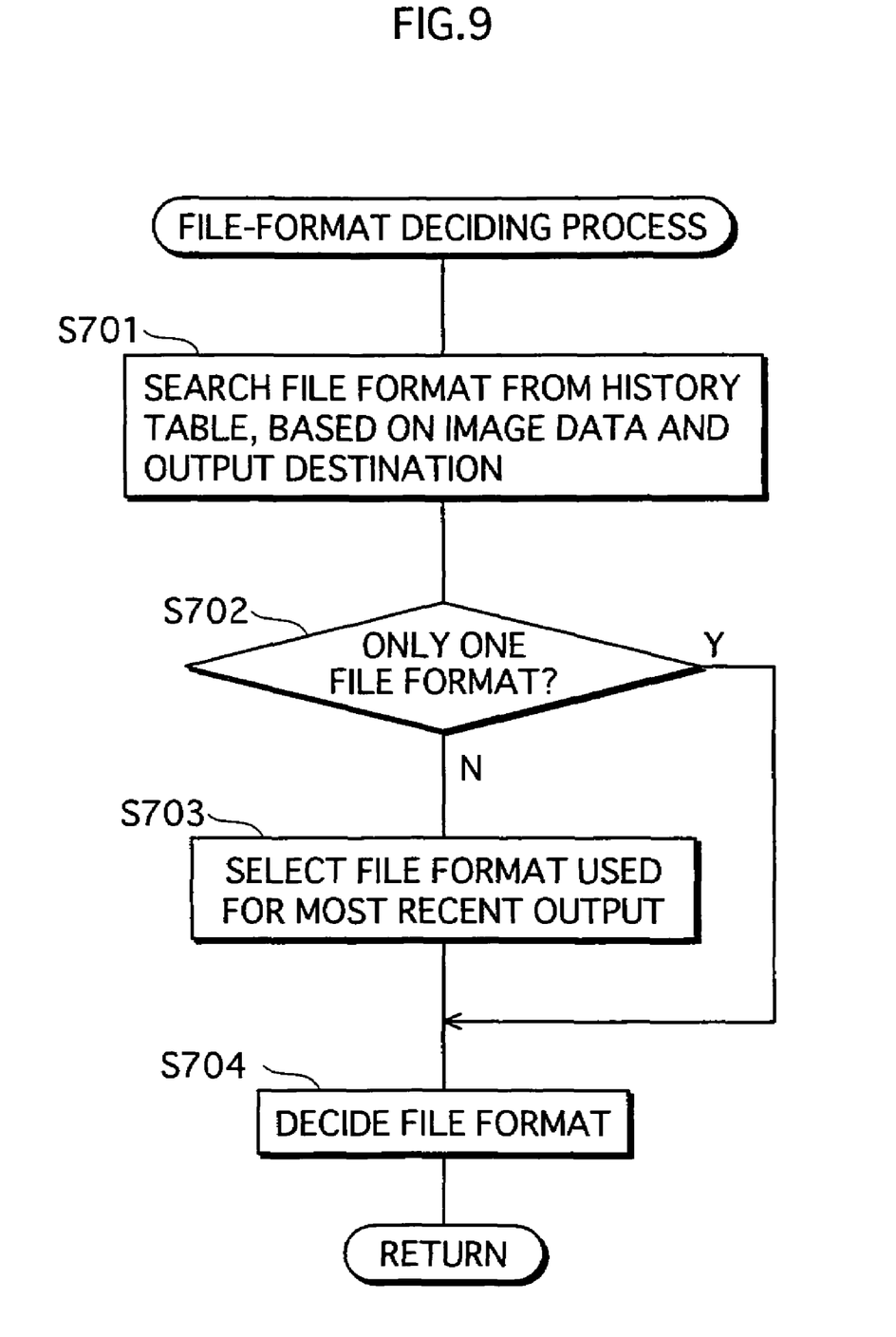
FIG. 9 is a flowchart showing operations performed by an MFP according to a modification, in particular showing details of a file-format deciding process.

FIG. 9 is a flow chart showing operations performed by the modified MFP according to this modification, in particular showing details of the file-format deciding process.

The modified MFP searches a file format from the history table based on the image data and the output destination (Step S701). At this point, a plurality of file formats will be found if more than one file format has previously been used for outputs to the destination.

When multiple types of file formats are found (Step S702: N), the modified MFP selects a file format used for the most recent output (Step S703).

The modified MFP decides the selected file format as the file format for outputting the image data (Step S704).

Alternatively, if only one file format is found (Step S702: Y), the modified MFP decides this file format as the file format for outputting the image data (Step S704).

(8) In the above embodiments, an output instruction for the already-stored image data is received via e-mail sent from an external terminal. However, this output instruction can be received by a method other than e-mail, or can be received as an input from a touch-panel provided with the MFP.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An image-forming apparatus for copying an original source, comprising:
   an image reading unit operable to read image data from the original source;
   an image-data storing unit operable to store the read image data in a predetermined file format wherein the image-data storage unit uses only one type of file format as the predetermined filed format, and the predetermined file format is a compression format for compressing the read image data;
   an image forming unit operable to form an image on a recording medium by reading out the stored image data;
   an output-instruction receiving unit operable to receive an output instruction including specification information for specifying a file format that is to be used for outputting the stored image data;
   a converting unit operable to convert the stored image data into the file format specified by the specification information; and
   an output unit operable to output the converted image data to a destination;
   an image compressing unit operable to compress the read image data in the compression format, and send the compressed image data to the image-data storing unit; and
   an image expanding unit operable to expand the compressed image data using an expansion format corresponding to the compression format, and send the expanded image data to the image forming unit and the converting unit.

2. The image-forming apparatus of claim 1, further comprising:
   a correspondence-table storing unit operable to store a correspondence table in which one or more destinations are associated with one or more file formats, wherein
   the specification information is one of the destinations, and
   the converting unit refers to the correspondence table and specifies the file format for the conversion according to the specified destination.

3. The image-forming apparatus of claim 2, wherein one or more output histories regarding the output image data are used as the correspondence table, a destination and a file format used for an output to the destination having been associated in each of the output histories.

4. The image-forming apparatus of claim 1, further comprising:
   a history storing unit operable to store one or more output histories regarding the output image data, a destination and a file format used for an output to the destination having been associated in each of the output histories,
   wherein the converting unit specifies the file format for the conversion according to the specification information, when information indicating the file format that is to be used for outputting the stored image data is included in the output instruction as the specification information, or otherwise refers to the output histories to specify the file format.

5. The image-forming apparatus of claim 4, wherein the converting unit selects a file format used for a most recent output to the destination, to which the converted image data is to be output, as the file format, when a plurality of file formats has been associated with the destination in the output histories.

6. The image-forming apparatus of claim 1, wherein the image compressing unit and the image expanding unit are composed of hardware.

7. The image-forming apparatus of claim 1, wherein the read image data stored in the image-data storing unit can be repeatedly read without the image reading unit reading the image data again from the original source.

8. An image data transmission apparatus, comprising:
an image data storing unit operable to store image data from an original source in a predetermined storage format in a storage medium;
an output instruction receiving unit operable to receive an output instruction including destination information for specifying an output destination for the image data stored in the storage medium wherein the output instruction received by the output instruction receiving unit includes an output format specification information;
an output format deciding unit operable to decide on an output format of the image data, wherein the output format is one of a plurality of output formats and wherein the output format deciding unit is operable to decide on the output format consistent with the output format specified in the output format specification information;
a converting unit operable to convert the image data stored in the storage medium from the predetermined storage format to the output format decided by the output format deciding unit; and
an output transmission unit operable to transmit the converted image data to the destination specified in the destination information;
wherein when the output instruction received by the output instruction receiving unit does not include the output format specification information, the output format deciding unit decides on the output format based on a history of transmission of the image data.

9. The image transmission apparatus of claim 8,
wherein the predetermined storage format is a reversible compression format, and
wherein each of the plurality of output formats is one of a reversible compression format or a non reversible compression format.

10. The image transmission apparatus of claim 9,
wherein the predetermined storage format is a JBIG format, and
wherein the plurality of output formats include JPEG, TIFF and PDF.

11. The image transmission apparatus of claim 8, wherein the output format deciding unit consults an output history table to determine a previous output format of the image data sent to the same destination in a previous transmission of the image data and sets the output format to the previous output format.

* * * * *